(12) United States Patent
Kato et al.

(10) Patent No.: US 6,459,734 B1
(45) Date of Patent: Oct. 1, 2002

(54) MOTION DETECTION CIRCUIT AND A NOISE SUPPRESSION CIRCUIT INCLUDING THE SAME

(75) Inventors: Noriyoshi Kato; Keiji Toyoda, both of Hamamatsu; Yukio Fujita, Kakegawa; Toshiyuki Sano; Misa Kasahara, both of Yokohama, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/562,476

(22) Filed: May 1, 2000

(30) Foreign Application Priority Data

Jun. 21, 1999  (JP) ............................................. 11-173821

(51) Int. Cl.$^7$ .............................. H04N 7/36; H04N 7/50
(52) U.S. Cl. .................. 375/240.12; 348/620; 348/621; 348/700; 375/240.16; 382/236
(58) Field of Search ................................ 348/699, 700, 348/701, 409.1, 451, 452, 620, 621; 375/240.12, 240.16; 382/236, 263, 264, 266, 267, 268; H04N 7/36, 7/50

(56) References Cited

U.S. PATENT DOCUMENTS

| | | | |
|---|---|---|---|
| 4,884,136 A | * 11/1989 | Ninomiya et al. | 348/701 |
| 5,276,521 A | * 1/1994 | Onda | 348/620 |
| 5,428,693 A | * 6/1995 | Murakami et al. | 375/240.16 |
| 5,497,203 A | * 3/1996 | Kayashima et al. | 348/699 |
| 5,528,313 A | * 6/1996 | Tanaka et al. | 348/699 |
| 5,539,469 A | * 7/1996 | Jung | 375/240.14 |
| 5,600,737 A | 2/1997 | Kato et al. | |
| 5,602,591 A | * 2/1997 | Saiki | 348/699 |
| 5,838,828 A | 11/1998 | Mizuki et al. | |
| 5,969,777 A | * 10/1999 | Mawatari | 375/240.12 |
| 6,008,866 A | * 12/1999 | Komatsu | 375/240.12 |
| 6,061,100 A | * 5/2000 | Ward et al. | 348/700 |

FOREIGN PATENT DOCUMENTS

| | | |
|---|---|---|
| EP | 0310032 | 4/1989 |
| EP | 0502615 | 9/1992 |
| EP | 0777388 | 6/1997 |
| JP | 7-131676 | 5/1995 |
| JP | 9-81754 | 3/1997 |

OTHER PUBLICATIONS

Nogaki S. et al.: "A Study on HDTV signal coding with motion adaptive noise reduction".
U.S. Ser. No. 09/394,685.
U.S. Ser. No. 09/394,684.

* cited by examiner

Primary Examiner—Howard Britton
(74) Attorney, Agent, or Firm—Louis Woo

(57) ABSTRACT

An interframe difference signal is generated from the video signal and its one-frame delayed video signal. A filter removes a carrier color signal from the interframe difference signal to output the interframe difference luminance signal. A first motion judging circuit judges a motion in the video signal at a target pixel from the interframe difference luminance signal to output a first motion judging result in accordance with a first edge detection signal. A second motion judging circuit judges a motion in the video signal at the target pixel from a luminance signal and the carrier signal in the interframe difference signal to output a second motion judging result in accordance with a second edge detection circuit. The first and second motion judging results are combined. A majority determining circuit determines majority of the combined result from adjacent Q pixels in accordance with a third edge detection signal. A circular signal generation circuit generates a coefficient K according to the result of the majority determining circuit. The interframe difference signal is multiplied with k to generate a circulation signal. A subtractor subtracts the circulation signal from the video signal to generate an output video signal of which noise is suppressed.

35 Claims, 8 Drawing Sheets

FIG. 4A
FIG. 4B
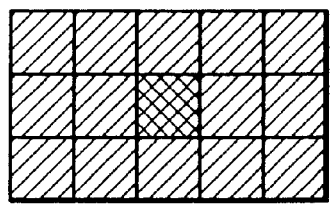
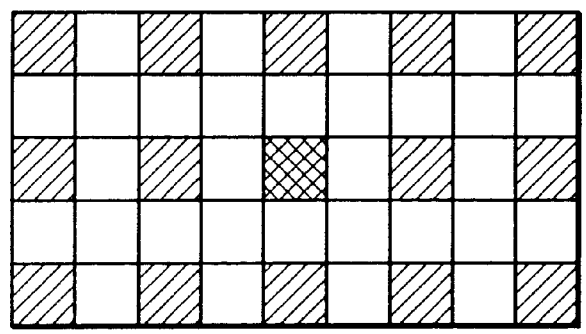
TP
TARGET PIXEL
PERIPHERAL PIXEL

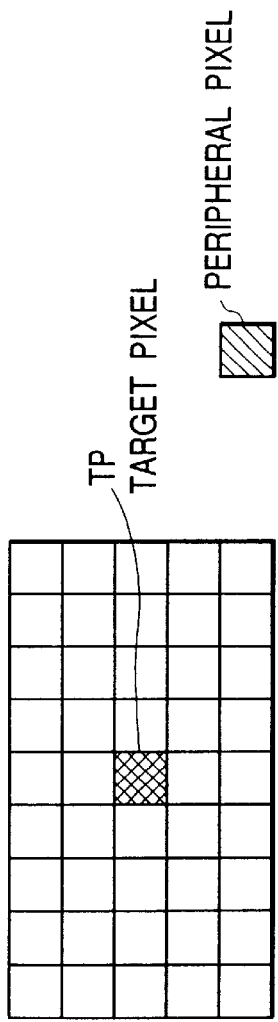
FIG. 5A
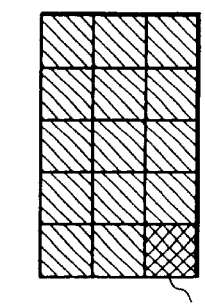
FIG. 5B
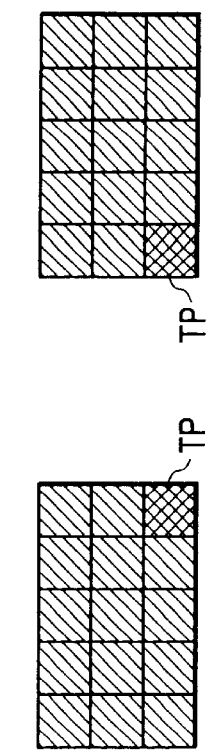
FIG. 5C
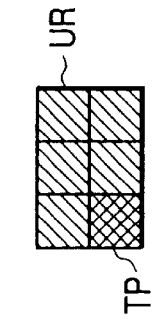
FIG. 5D
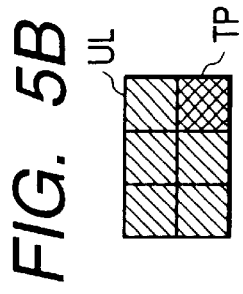
FIG. 5E
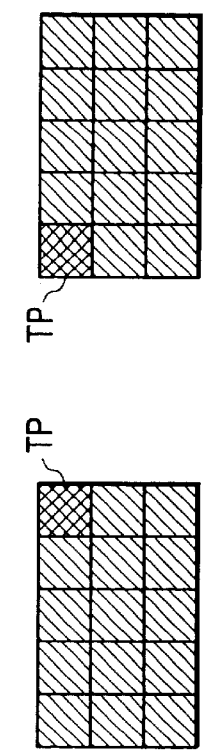
FIG. 5F, FIG. 5G, FIG. 5H, FIG. 5I
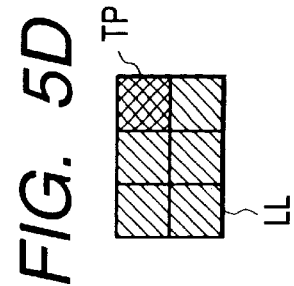

TP

TP

MOTION DETECTION CIRCUIT AND A NOISE SUPPRESSION CIRCUIT INCLUDING THE SAME

BACKGROUND OF THE INVENTION

1. Field of the Invention

This invention relates to a motion detection circuit for detecting motion in a video signal and a noise suppression circuit including the motion detection circuit.

2. Description of the Prior Art

A motion detection circuit for detecting motion in a video signal from a difference signal between the video signal and one-frame delayed video signal is known and a noise suppression circuit is also known. The noise suppression circuit includes the motion detection circuit, a circulation signal generation circuit for generating a circulation signal in accordance with the difference signal and the motion detection signal, and a subtractor for subtracting the circular signal from the video signal to output a noise suppressed video signal. Such a prior art motion detection circuit and a prior art noise suppression circuit are disclosed in Japanese patent application provisional publication No. 9-81754.

FIG. 9 is a block diagram of such a prior art noise suppression circuit including a prior art motion detection circuit.

The prior art motion detection circuit includes a frame memory 610 for generating a delayed video signal from the noise suppressed video signal Vo, a subtractor 602 for generating a difference signal (interframe difference signal) between the video signal Vi and the delayed video signal, a motion detection circuit 603 for detecting a motion from the video signal Vi and the delayed video signal to output a motion detection signal.

The noise suppression circuit further includes a subtractor 607 for generating the difference signal between the video signal Vi and the delayed video signal, a circulation amount determining circuit 608 for generating a circulation signal from the difference signal in accordance with the motion detection signal, and a subtractor 609 for obtaining a difference between the video signal Vi and the circulation signal to output a noise suppressed video signal Vo.

SUMMARY OF THE INVENTION

The aim of the present invention is to provide a superior motion detection circuit and a superior noise suppression circuit.

According to this invention there is provided a motion detection circuit. A delay generates a delayed video signal from a video signal including a luminance signal and a carrier color signal. The delayed video signal is delayed by one frame from the video signal. An interframe difference signal generation circuit generates an interframe difference signal from the video signal and the delayed video signal. A filter filters the interframe difference signal to remove the carrier color signal to output the interframe difference luminance signal. A first motion judging circuit judges whether an image at a target pixel in the video signal is moving from the interframe difference luminance signal to output a first motion judging result. A second motion judging circuit judges whether the image is moving from the interframe difference signal to output a second motion judging result. A third motion judging circuit judges whether the image is moving by combining the first motion judging result with the second motion judging result to output a judging result.

The motion detection circuit may further include an edge detection signal generation circuit for detecting an edge at the target pixel in the video signal and detecting an edge at the target pixel in the delayed video signal and outputting an edge detection signal from either of the detected edge in the video signal or the detected edge in the delayed video signal selected in accordance with a selection signal. The first motion judging circuit judges whether the image is moving from the interframe difference luminance signal at a pixel area around the target pixel. A size of the pixel area is controlled in accordance with the edge detection signal.

The motion detection circuit may further include an edge detection signal generation circuit for detecting an edge at the target pixel in the video signal and detecting an edge at the target pixel in the delayed video signal and outputting an edge detection signal from either of the detected edge in the video signal or the detected edge in the delayed video signal selected in accordance with a selection signal. The second motion judging circuit judges whether the image is moving in accordance with the interframe difference signal at a pixel area around the target pixel. A size of the pixel area is controlled in accordance with the edge detection signal.

In the motion detection circuit, the third motion judging circuit includes a logical operation circuit for effecting logical operation between the first motion judging result from the first motion judging circuit and the second motion judging result from the second motion judging circuit such that, except when the first and second motion judging results agree with each other in a moving condition and a still condition. The logical operation result is biased toward the moving condition.

In the motion detection circuit, the first motion detection circuit judges whether the image is moving with (J-1) threshold values to output J-valued the first motion judging result. J is a natural number more than one.

In the motion detection circuit, the second motion detection circuit judges whether the image is moving with (J-1) threshold values to output J-valued the second motion judging result. J is a natural number more than one. The second motion detection circuit further includes an interline interpolation circuit for interpolating the J-valued second motion judging result such that the J-valued second motion judging result at the target pixel is changed to the moving condition when the J-valued second motion judging result at the corresponding pixel on at least one of adjacent lines is judged to be the moving condition and horizontal interpolation circuit for interpolating the J-valued second motion judging result such that the J-valued second motion judging result at the target pixel is changed to the moving condition when the J-valued second motion judging result of at least one of adjacent pixels on the same line is judged to be the moving condition.

In the motion detection circuit, the first motion judging circuit includes a first peripheral pixel comparing circuit for detecting first polarities of the interframe difference luminance signal at each pixel at a first area around the target pixel and judging whether the image is moving in accordance with the detected first polarities with (J-1) threshold values to output a J-valued the first motion judging result. J is a natural number more than one. The second motion judging circuit may include a second peripheral pixel comparing circuit for detecting second polarities of the interframe difference signal at every other pixel in the horizontal and vertical directions at a second area around the target pixel and judging whether the image is moving in accordance with the detected second polarities with the (J-1) threshold values to output J-valued the second motion judging result. Moreover, the first motion judging circuit further includes a first polarity deviation detecting circuit for detecting third polarities of the interframe difference signal at each pixel of the video signal, detecting first agreement of the third polarities of all pixels at any of a first upper left area of the target pixel, a second upper right area of the target pixel, a first lower left area of the target pixel, and a first lower right area of the target pixel, and changing the first motion judging result from the first peripheral pixel comparing circuit from an intermediate moving condition to a moving condition in the presence of the first agreement when the first motion judging result from the peripheral pixel comparing circuit indicates the intermediate motion. The second motion judging circuit further includes a second polarity deviation detecting circuit for detecting fourth polarities of the interframe difference signal at each pixel of the video signal, detecting second agreement of the fourth polarities of every other pixels in the horizontal and vertical directions at any of a second upper left area of the target pixel, a second upper right area of the target pixel, a second lower left area of the target pixel, and a second lower right area of the target pixel, and changing the second motion judging result from the second peripheral pixel comparing circuit from an intermediate moving condition to a moving condition in the presence of the second agreement when the second motion judging result from the peripheral pixel comparing circuit indicates an intermediate moving condition.

The motion detection circuit may further include a majority detection circuit including a memory for detecting a majority of the judging results at Q pixels around the target pixels and judging the motion in the interframe difference signal at the target pixel in accordance with the detected majority to output the judging result such that the judging result is biased toward a moving condition when the judging results at Q pixels includes intermediate moving conditions. Q is a natural number more than one.

The first peripheral pixel comparing circuit may detect the first polarities among a positive polarity, a negative polarity, and a substantially zero level. The first peripheral pixel comparing circuit may include a comparing circuit for comparing the interframe difference luminance signal with a threshold value to detect the substantially zero level of the interframe difference luminance signal.

The second peripheral pixel comparing circuit detects the second polarities among a positive polarity, a negative polarities, and a substantially zero level. The second peripheral pixel comparing circuit includes a comparing circuit for comparing the interframe difference signal with a threshold value to detect the substantially zero level of the interframe difference signal.

The first polarity deviation detecting circuit detects the third polarities among a positive polarity, a negative polarity, and a substantially zero level. The first polarity deviation detecting circuit includes a comparing circuit for comparing the interframe difference luminance signal with a threshold value to detect the substantially zero level of the interframe difference luminance signal.

The second polarity deviation detecting circuit detects the fourth polarities among a positive polarity, a negative polarities, and a substantially zero level. The second polarity deviation detecting circuit includes a comparing circuit for comparing the interframe difference signal with a threshold value to detect the substantially zero level of the interframe difference signal.

The motion detection circuit may further include an edge detection signal generation circuit for detecting an edge at the target pixel in the video signal and detecting an edge at the pixel in the delayed video signal and outputting an edge detection signal from either of the detected edge in the video signal or the detected edge in the delayed video signal selected in accordance with a selection signal. Moreover, the first polarity deviation detecting circuit changes a size of the first upper left area, the second upper right area, the first lower left area, and the first lower right area in accordance with the edge detection signal. Moreover, the second polarity deviation detecting circuit changes a size of the second upper left area, the second upper right area, the second lower left area, and the second lower right area in accordance with the edge detection signal.

The motion detection circuit may further include an edge detection signal generation circuit for detecting an edge at the target pixel in the video signal and detecting an edge in the delayed video signal and outputting an edge detection signal from either of the detected edge in the video signal or the detected edge in the delayed video signal selected in accordance with a selection signal. Moreover, the majority detection circuit includes a switching circuit for outputting either of the motion judging result judged in accordance with the detected majority or the judging result from the third motion judging circuit in accordance with the edge detection signal.

According to this invention, there is provided a noise suppression apparatus. It includes: a motion detection circuit mentioned above; a circulation signal generation circuit including: a coefficient generation circuit for generating a coefficient k, k≦0<1 in accordance with the judging result of the motion detection circuit; and a multiplier for multiplying the video signal by the coefficient k to output a circulation signal; and a difference signal generation circuit for generating a difference signal between the circulation signal and the video signal to output a noise suppressed video signal.

In the noise suppression apparatus, the coefficient k generated when the motion judging circuit judges that the image is in a stopping condition is greater than the coefficient k generated when the motion judging circuit judges that the image is in a moving condition.

BRIEF DESCRIPTION OF THE DRAWINGS

The object and features of the present invention will become more readily apparent from the following detailed description taken in connection with the accompanying drawings in which:

FIGS. 4A and 4B are illustrations of the embodiment for illustrating operation of the peripheral pixel comparing circuits shown in FIG. 2;

FIGS. 5A to 5I are illustrations of areas of pixels to be processed by a polarity deviation compensation circuit shown in FIG. 2;

The same or corresponding elements or parts are designated with like references throughout the drawings.

DETAILED DESCRIPTION OF THE INVENTION

Hereinbelow will be described an embodiment of this invention.

Figure 1:
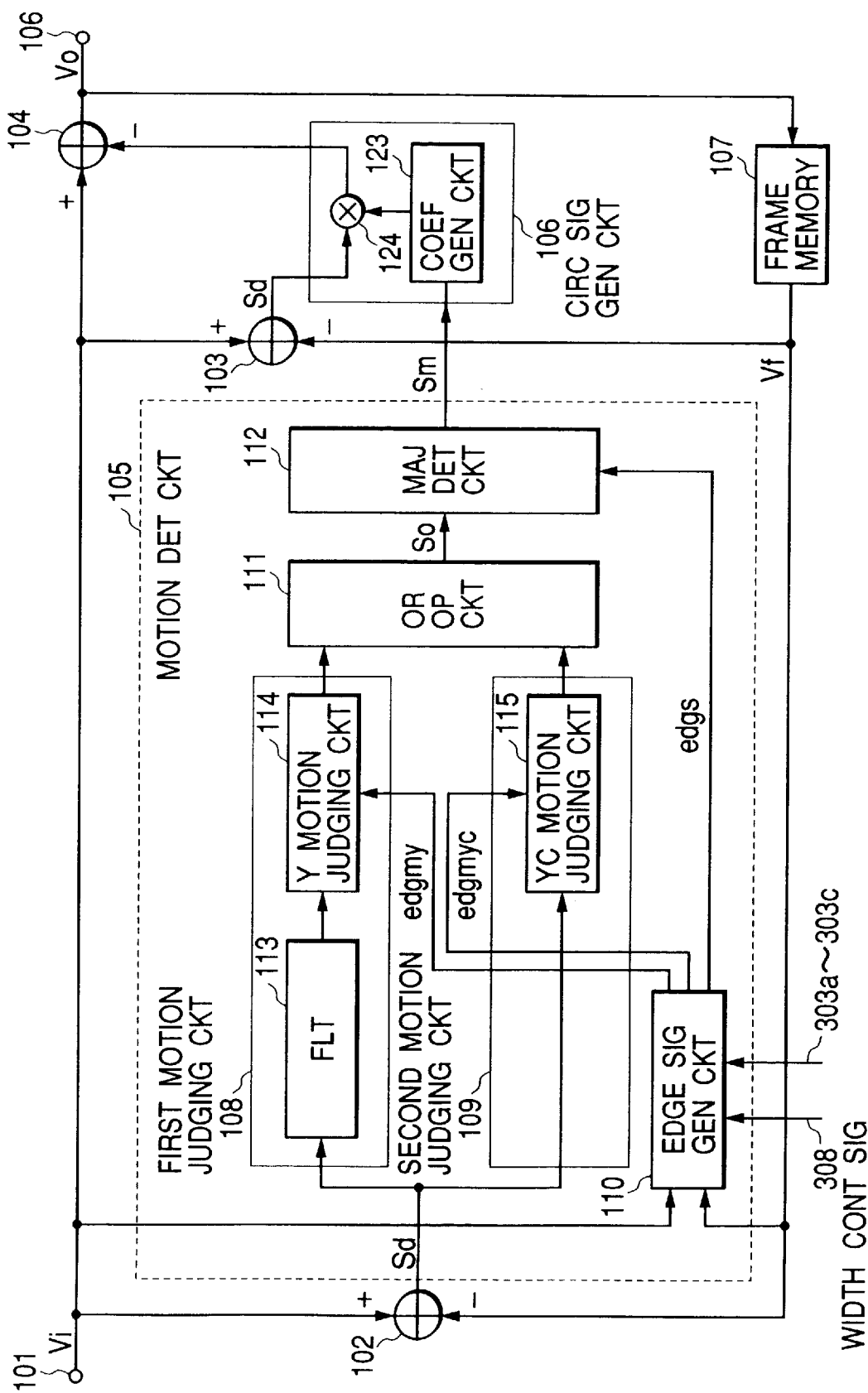
FIG. 1 is a block diagram of a noise suppression apparatus of this embodiment including a noise suppression apparatus including a motion detection circuit.

FIG. 1 is a block diagram of a noise suppression apparatus of this embodiment.

The noise suppression apparatus includes a subtractor 102 for generating an interframe difference signal, a subtractor 103 for generating the interframe difference signal, a motion detection circuit 105 for detecting motion in a video signal Vi, a circular signal generation circuit 106 for generating a circular signal, a frame memory 107 for delaying a video signal Vi to generate a delayed video signal Vf, and a subtractor 104 for subtracting the circular signal from the video signal Vi to generate an output video signal Vo.

The motion detection circuit 105 includes a first motion judging circuit 108, a second motion judging circuit 109, an edge detection circuit 110, an OR operation circuit 111, and a majority determining circuit 112.

The first motion judging circuit 108 includes a filter 113 for removing color carrier components from the interframe difference signal Sd from the subtractor 102 to output an interframe difference luminance signal and a Y motion judging circuit 114 for judging whether an image at a target pixel is moving from the interframe difference luminance signal. The second motion judging circuit 109 includes a YC motion judging circuit 115 for judging whether an image at a target pixel in the video signal Vi is moving from the interframe difference luminance signal and the color carrier components in the interframe difference signal Sd.

The edge signal generation circuit 110 detects edges in the video signal Vi and the delayed video signal Vf to output an edge detection signal edgmy for the Y motion judging circuit 114, an edge detection signal edgmyc for the YC motion judging circuit 115, and an edge detection signal edgs for the majority determining circuit 112.

A video signal Vi supplied to a video signal input terminal 101 includes a luminance signal and color carrier components generated by a single plate color imager (including a video signal from a CCD subjected to a pre-process such as CDS (Collimated Double Sampling) processing for removing reset noise. The video signal Vi is supplied to the subtractor 102, the subtractor 103 and the subtractor 104. The frame memory 107 delays the output video signal Vo from the subtractor 104 by one frame to output the delayed video signal Vf. The subtractor 102 subtracts the delayed video signal Vf from the video signal Vi to generate an interframe difference signal Sd. The subtractor 103 also generates the interframe difference signal Sd. Thus, either of the subtractor 102 or the subtractor 103 can be omitted.

The interframe difference signal Sd is supplied to the first motion judging circuit 108 and the second motion judging circuit 109 in the motion detection circuit 105. The filter 113 removes the color carrier components (carrier color signal) in the interframe difference signal Sd to output the interframe difference luminance signal. The Y motion judging circuit 114 judges a degree of motion (J-valued judging result) in the video signal Vi from the interframe difference luminance signal at the target pixel in accordance with an edge detection signal edgmy. The YC motion judging circuit 115 judges a degree of motion (J-valued) in the video signal Vi from the interframe difference signal Sd according to an edge detection signal edgmyc.

The edge signal generation circuit 110 detects edges in the video signal Vi and the delayed video signal Vf to generate the edge detection signal edgmy for the Y motion judging circuit 114, the edge detection signal edgmyc for the second motion judging circuit 109, and the edge detection signal edgs for the majority determining circuit 112 in accordance with selection signals 303a to 303c and a width control signal 308.

The motion judging results from the Y motion judging circuit 114 and the YC motion judging circuit 115 are supplied to the OR operation circuit 111. The OR operation circuit 111 judges the motion at the target pixel by combining the first motion judging result from the Y motion judging circuit 114 with the second motion judging result from the YC motion judging circuit 115 such that, except when the first and second motion judging results from the Y motion judging circuit 114 and the YC motion judging circuit 115 agree with each other in a moving condition and a still (stopping) condition, the OR operation result is biased toward the moving condition. In other words, in combining the first and second motion judging results, the first and second judging results are biased to the side of moving when the first motion judging result disagrees with the second motion judging result and either of first or second motion judging result indicates intermediate degree of motion.

The combined result is supplied to the majority determining circuit 112. The majority determining circuit 112 determines majority of the combined results at Q pixels at a predetermined peripheral area around the target pixel to output a motion detection signal Sm of the motion detection circuit 105. The motion detection signal Sm is supplied to a circular signal generation circuit 106.

The circular signal generation circuit 106 includes a coefficient generation circuit 123 for generating a coefficient K in accordance with the motion detection signal Sm and a multiplier 124 for multiplying the interframe difference signal Sd with the coefficient K.

The coefficient generation circuit 123 determines the coefficient K as follows:

When an image at the target pixel is judged from the interframe difference signal Sd at the target pixel is judged to be a moving condition, K=k3.

When an image at the target pixel is judged from the interframe difference signal Sd at the target pixel is judged to be an intermediate moving condition, K=k2.

When an image at the target pixel is judged from the interframe difference signal Sd at the target pixel is judged to be a stopping condition (still condition), K=k1. $0 \leq k3 < k2 < k1 < 1$.

The interframe difference signal Sd is multiplied by the coefficient K with the multiplier 124 to generate the circular signal which is supplied to the subtractor 104. The subtractor 104 subtracts the circular signal from the video signal Vi to generate the noise suppressed output video signal Vo.

Figure 2:
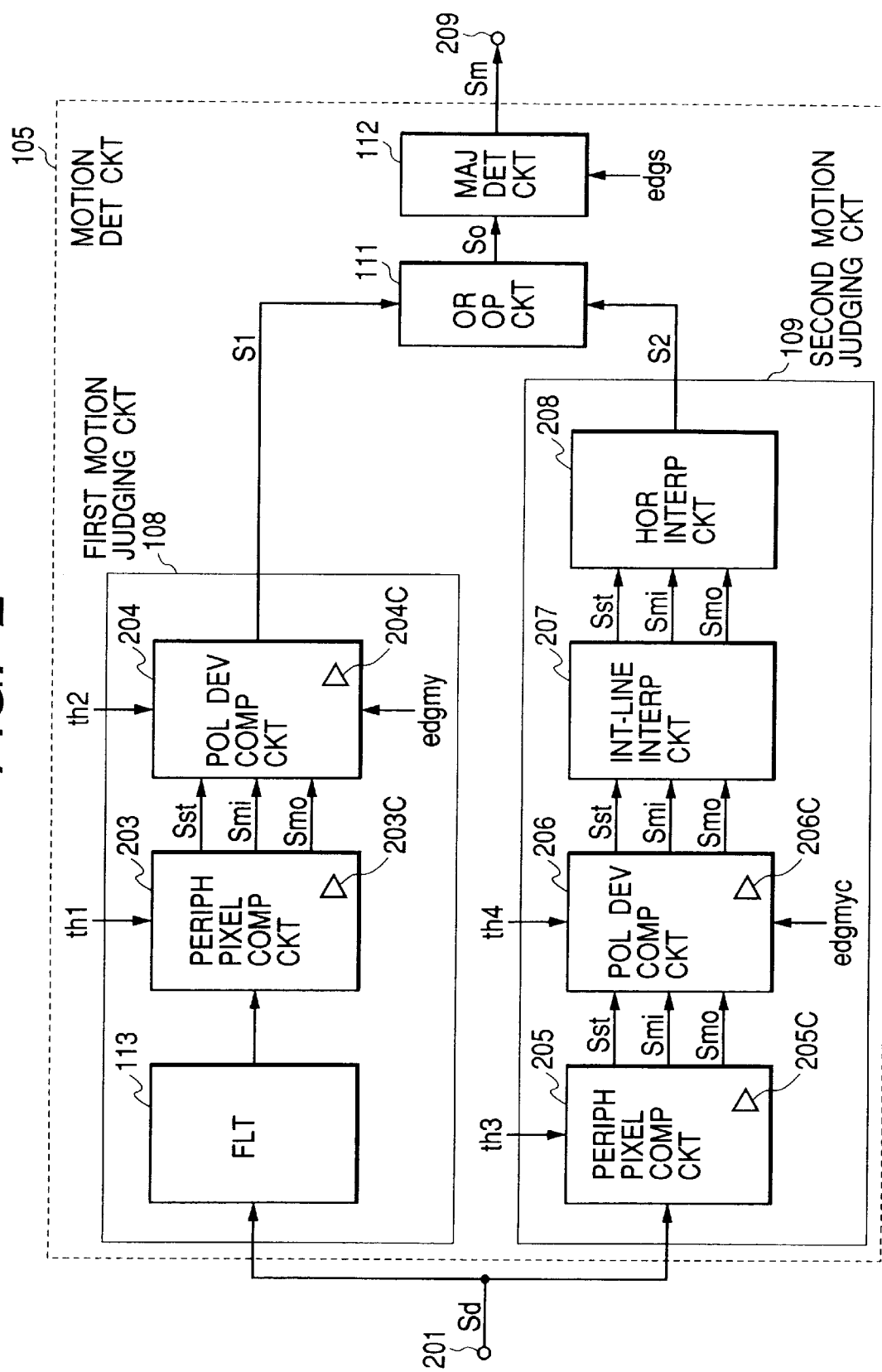
FIG. 2 is a block diagram of the motion detection circuit shown in FIG. 1.
Figures 3A, 3B:
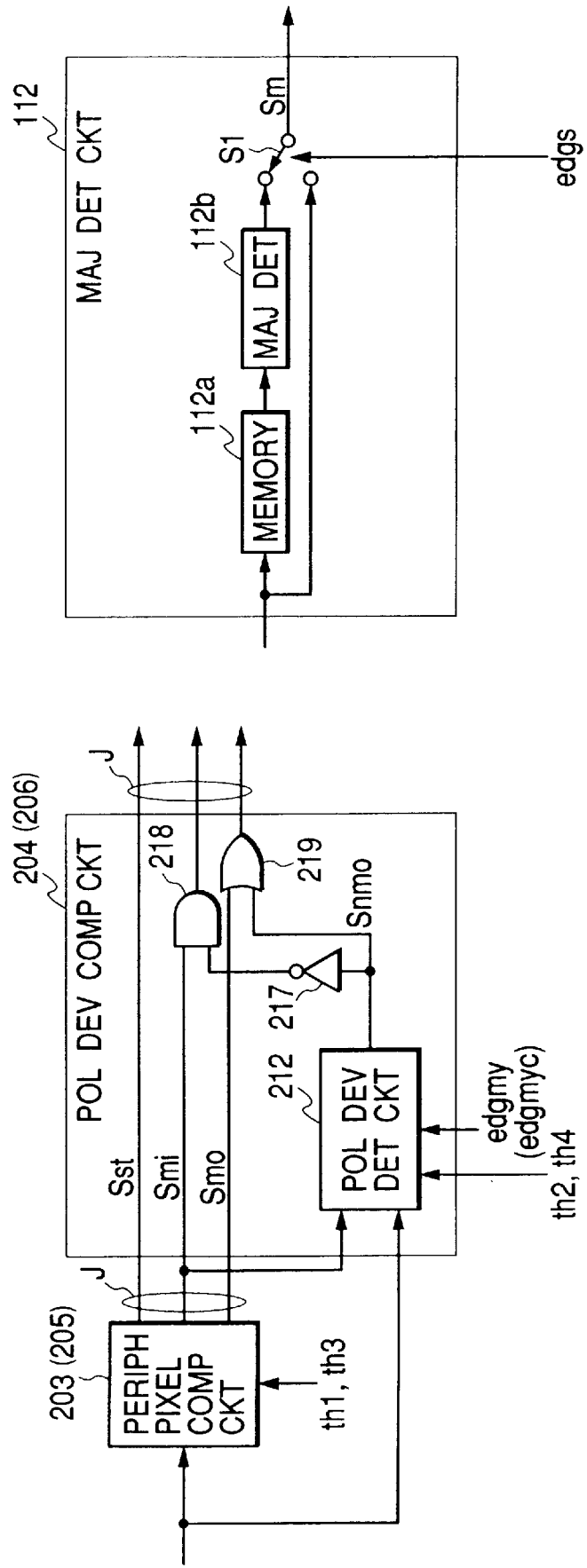
FIG. 3A is a block diagram of the polarity deviation compensation circuit shown in FIG. 2.
FIG. 3B is a block diagram of the majority determining circuit shown in FIG. 1.
Figure 6A:
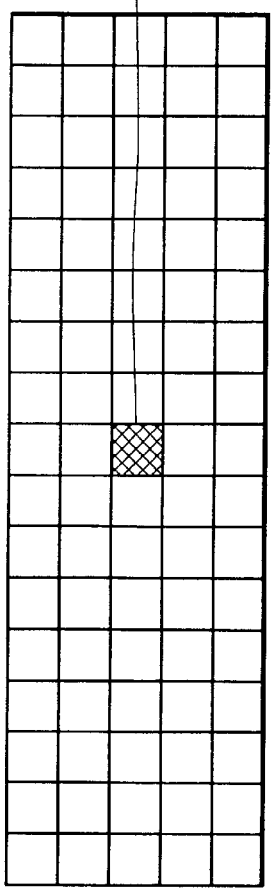
FIGS. 6A to 6I are illustrations of areas of pixels to be processed by another polarity deviation compensation circuit shown in FIG. 2.
Figure 6C:
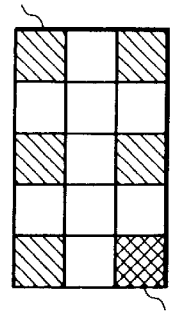
Figure 6E:
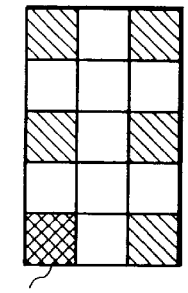
Figure 6G:
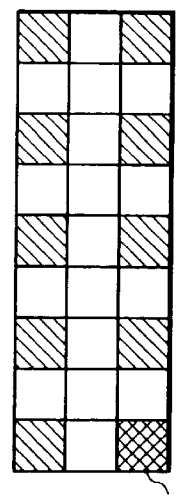
Figure 6I:
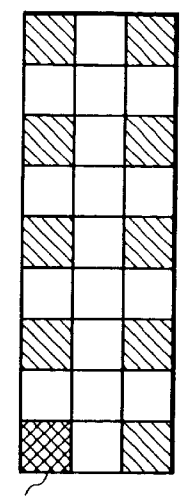
Figure 6B:
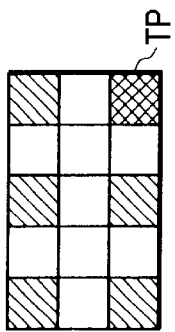
Figure 6D:
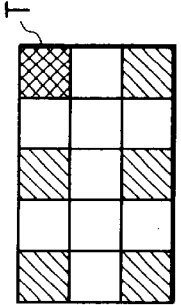
Figure 6F:
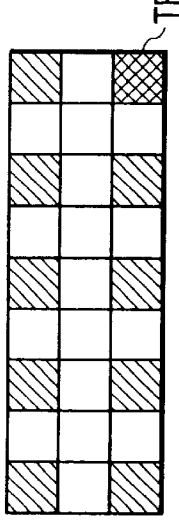
Figure 6H:
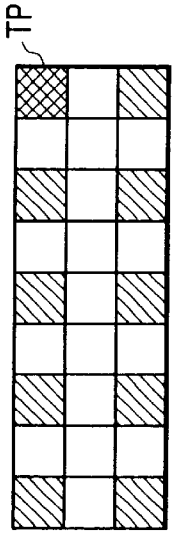

FIG. 2 is a block diagram of the motion detection circuit 105 shown in FIG. 1. FIG. 3A is a block diagram showing a structure of the polarity deviation compensation circuit 204 (206) shown in FIG. 2. FIG. 3B is a block diagram of the majority determining circuit 112 shown in FIG. 1.

The first motion judging circuit 108 includes the filter 113 for removing the color carrier components to output the interframe difference luminance signal, a peripheral pixel comparing circuit 203, and a polarity deviation compensation circuit 204.

The second motion judging circuit 109 includes a peripheral pixel comparing circuit 205, a polarity deviation compensation circuit 206, an interline interpolation circuit 207, and a horizontal interpolation circuit 208.

FIGS. 4A and 4B are illustrations of the embodiment for illustrating operation of the peripheral pixel comparing circuits 203 and 205.

The peripheral pixel comparing circuit 203 detects polarities (positive, zero, and negative) of the interframe difference luminance signal at each pixel at a predetermined area around a target pixel as shown in FIG. 4A, for example 5(H)×3(V) including the target pixel TP. The peripheral pixel comparing circuit 203 detects (counts) the number of positive polarities PP of the interframe difference luminance signal at the predetermined area and the number of negative polarities NP of the interframe difference luminance signal at the predetermined area and obtains a difference (PP−PN) in the number between the positive and negative polarities and an absolute value of the difference |PP−PN|. Further, the peripheral pixel comparing circuit 203 compares the absolute value |PP−PN| with first and second different references (J-1 different references), i.e., TH_S and TH_M, to output the motion judging result (J-valued result) of the peripheral pixel comparing circuit 203. J is a natural number more than one. If the peripheral pixel comparing circuit 203 detects a substantially zero level of the interframe difference luminance signal Sd, the peripheral pixel comparing circuit 203 does not count the pixels as the positive and negative polarities. More specifically, the peripheral pixel comparing circuit 203 includes a comparator 203c for comparing the interframe difference luminance signal with a threshold value th1 to detect the substantially zero level of the interframe difference luminance signal.

Accordingly, the judgement is effected as follows:

When TH_M≦|PP−NP|, the video signal at the target pixel is judged as moving (Smo).

When TH_S≦|PP−NP|<TH_M, the video signal at the target pixel is judged as an intermediate moving condition (Smi).

When 0≦|PP−NP|<TH_S, the video signal at the target pixel is judged as a stopping (still) condition (Sst).

The J-valued (three-valued) motion judging result of the peripheral pixel comparing circuit 203 is supplied to the polarity deviation compensation circuit 204 which effects motion judgment again when the judging result of the peripheral comparing circuit 203 is judged to be an intermediate moving condition. That is, when the judging result of the peripheral comparing circuit 203 is judged to be a moving or stopping condition, the judging result of the peripheral comparing circuit 203 is outputted as the first motion judging result of the first motion judging circuit 108.

FIGS. 5A to 5I are illustrations of areas of pixels to be processed by the polarity deviation compensation circuit 204. The upper left area UL shown in FIG. 5B, the upper right area UR shown in FIG. 5C, the lower left area LL shown in FIG. 5D, and the lower right area LR shown in FIG. 5E include the target pixel shown in FIG. 5A at respective corners. The areas shown in FIGS. 5B to 5E are used for detecting the polarity deviation when an edge is detected at the target pixel TP in the edge detection signal edgmy. On the other hand, when the edge detection signal edgmy indicates no edge (flat portion), the areas shown in FIGS. 5B to 5E are used.

When the J-valued (three-valued) motion judging result of the peripheral pixel comparing circuit 203 indicates an intermediate moving condition and the edge detection signal edgmy indicates an edge, the polarity deviation compensation circuit 204 detects the polarities of the interframe difference luminance signal at respective pixels at respective areas UL, UR. LL, and LR shown in FIGS. 5B to 5E. When there is any of UL, UR. LL, and LR areas where polarities of the interframe difference luminance signal at pixels at respective areas agree with each other, the polarity deviation compensation circuit 204 changes the motion judging result from the intermediate moving condition to a moving condition.

When the J-valued judging result of the peripheral pixel comparing circuit 203 indicates an intermediate moving condition and the edge detection signal edgmy indicates no edge, the polarity deviation compensation circuit 204 detects the polarities of the interframe difference luminance signal at respective pixels at respective areas shown in FIGS. 5F to 5I. When there is any of the areas shown in FIGS. 5F to 5I where polarities of the interframe difference luminance signal at pixels at respective areas agree with each other, the polarity deviation compensation circuit 204 changes the motion judging result from the intermediate moving condition to a moving condition.

More specifically, in FIG. 3A, the polarity deviation compensation circuit 204 (206) includes a polarity deviation detection circuit 212 and an inverter 217, an AND gate 218, and an OR gate 219. In response to an intermediate motion result Smi of the peripheral pixel comparing circuit 203, the polarity deviation compensation circuit 204 detects polarities of the interframe difference luminance signal at each pixel of the video signal, detects agreement of the polarities of all pixels at any of the upper left area UL of the target pixel, the upper right area UR of the target pixel, the lower left area LL of the target pixel, and the lower right area LR of the target pixel, and judges the motion in the interframe difference luminance signal at the target pixel TP as moving in the presence of the agreement. Moreover, the polarity deviation compensation circuit 204 detects the polarities among a positive polarity, a negative polarity, and a substantially zero level, wherein the polarity deviation detection circuit 212 includes a comparator 204c for comparing the interframe difference luminance signal with a threshold value th2 to detect the substantially zero level of the interframe difference signal.

When the peripheral pixel comparing circuit 201 judges that an image at the target pixel TP in the video signal Vi as an intermediate moving condition (Smi), the polarity deviation compensation circuit 204 compensates the first judging result of the peripheral pixel comparing circuit 201 from the intermediate moving condition (Smi) with the inverter 217 and the AND gate 218. On the other hand, the OR gate 219 does not compensate the judging result of the peripheral pixel comparing circuit 201 in accordance with the result of the polarity deviation detection circuit 212.

More specifically, when the peripheral pixel comparing circuit 203 judges the motion as an intermediate moving condition and the polarity deviation detection circuit 212 judges the motion to be moving, the polarity deviation detection circuit 212 outputs L logic level at a signal Sst, H logic level at a signal Smi (an output of the AND gate 218), and L logic level at a signal Smo (an output of the OR gate 219). In response to the signal Smi, the polarity deviation detection circuit 212 judges the motion and if polarities of all pixels any of areas agree with each other, the polarity deviation detection circuit 212 outputs H logic level. Then, the inverter 217 outputs L logic level, so that the H logic level at an output of the AND gate 218 is changed to L logic level. On the other hand, L logic level at an output of the OR gate 219 is changed to H logic level, so that the intermediate motion judged by the peripheral pixel comparing circuit is 201 is changed to a moving condition.

If the judging result of the polarity deviation detection circuit 212 is not moving, the polarity deviation detection circuit 202 outputs L logic level, so that the AND gate 218 remains H logic level and the output of the OR gate 219 remains L logic level, As mentioned, the motion judgement is effected again, so that a more accurate judgement is provided.

On the other hand, when the edge detection signal edgmy indicates a flat portion, the areas shown in FIGS. 5F to 5I are used for detecting the polarity deviation.

FIGS. 6A to 6I are illustrations of areas of pixels to be processed by the polarity deviation compensation circuit 206.

The peripheral pixel comparing circuit 205 and polarity deviation compensation circuit 206 similarly judges motion in the interframe difference signal Sd. However, the peripheral pixel comparing circuit 205 judges motion from the interframe difference signal Sd every other pixel in the horizontal and vertical directions at an area around the target pixel as shown in FIG. 4B. Moreover, the peripheral pixel comparing circuit 205 detects the polarities among a positive polarity, a negative polarity, and a substantially zero level, wherein the peripheral pixel comparing circuit 205 comprises a comparator 205c for comparing the interframe difference signal with a threshold value th3 to detect the substantially zero level of the interframe difference signal.

The polarity deviation compensation circuit 206 judges motion from the interframe difference luminance signal every other pixel in the horizontal and vertical directions at an area around the target pixel as shown in FIGS. 6B to 6E when the edge detection signal edgmyc indicates an edge. When the edge detection signal edgmyc indicates a flat portion, the polarity deviation compensation circuit 206 judges motion from the interframe difference signal Sd every other pixel in the horizontal and vertical directions at an area around the target pixel as shown in FIGS. 6F to 6I. Moreover, the polarity deviation compensation circuit 206 detects the polarities among a positive polarity, a negative polarities, and a substantially zero level, wherein the polarity deviation detection circuit 212 in the polarity deviation compensation circuit 206 includes a comparator 206c for comparing the interframe difference signal with a threshold value th4 to detect the substantially zero level of the interframe difference signal.

The interline interpolation circuit 207 interpolates the J-valued judging result from the polarity deviation compensation circuit 206 such that the J-valued judging result at the target pixel is changed to the J-valued judging result at the corresponding pixel on at least one of adjacent lines when the J-valued judging result at the corresponding pixel on at least one of adjacent lines is moving. That is, the J-valued judging result at the target pixel is equalized to that at the corresponding pixel on at least one of adjacent lines when the J-valued judging result at the corresponding pixel on at least one of adjacent lines is moving.

The horizontal interpolation 208 interpolates the J-valued judging result such that the J-valued judging result at the target pixel is changed to the J-valued judging result of at least one of adjacent pixels on the same line when the J-valued judging result of at least one of adjacent pixels on the same line is moving. That is, the J-valued judging result at the target pixel is equalized to that of at least one of adjacent pixels on the same line when the J-valued judging result of at least one of adjacent pixels on the same line is moving. Thus, the area of which motion detection result is judged to be moving is made broader, so that the reproduced image becomes clear.

The first and second motion judging results are supplied to the OR operation circuit 111 as mentioned above, and the combined result from OR operation circuit 111 is supplied to the majority determining circuit 112.

Figure 7A:
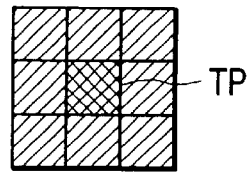
FIGS. 7A and 7B are illustrations of this embodiment showing operation of the majority determining circuit shown in FIG. 1.
Figure 7B:
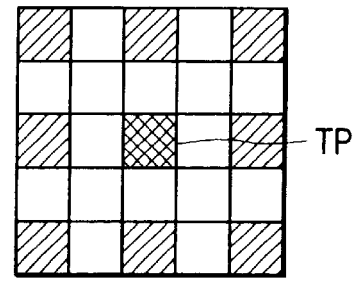

FIGS. 7A and 7B are illustrations of this embodiment showing operation of the majority determining circuit 112.

The majority determining circuit 112 includes a memory 112a, a majority detector 112b, and a switch S1. The memory 112a stores the combined result and reads and outputs the combined results at a predetermined peripheral area including eight pixels as shown in FIG. 7A, for example, eight pixels around the target pixel TP.

The majority detector 112 detects majority of the Q results of the polarity deviation compensation circuit 206 at Q pixels around the target pixel. The switch S1 outputs either of the result of the majority detector 112b or the second judging result of the polarity deviation compensation circuit 206 in accordance with the edge detection signal edgs to output the motion detection signal Sm.

The majority detector 112b detects majority of eight second judging results and if more than R1 pixels show the same judging result, the majority detector 112b detects the majority as the third judging result to equalize the motion judgment at the target pixel TP to the judging results at adjacent pixels around the target pixel TP to avoid an isolated judging result. More specifically, if the motion at four pixels out of the eight adjacent pixels are judged to be moving and motion at another four adjacent pixels are judged to be intermediate motion, the third judging result is made to be the intermediate motion. If the motion at four adjacent pixels is judged to be intermediate motion and motion at another four pixels is judged to be stopping, the third judging result of the target pixel is judged as stopping to provide the third judging result which is weighted (biased) to the side of stopping. That is, the intermediate motion Judged by the peripheral pixel comparing circuit 203 and the moving condition judged by the polarity deviation compensation circuit 204 are Judged again with the result biased toward stopping, so that noise at the image which is stopping is reduced.

The switch S1 either outputs the combined judging result So at the target pixel TP from the OR operation circuit ill or the third judging result from the majority detector 112b in accordance with the edge detection signal edgs. The predetermined peripheral area including eight pixels as shown in FIG. 7B may used.

Figure 8:
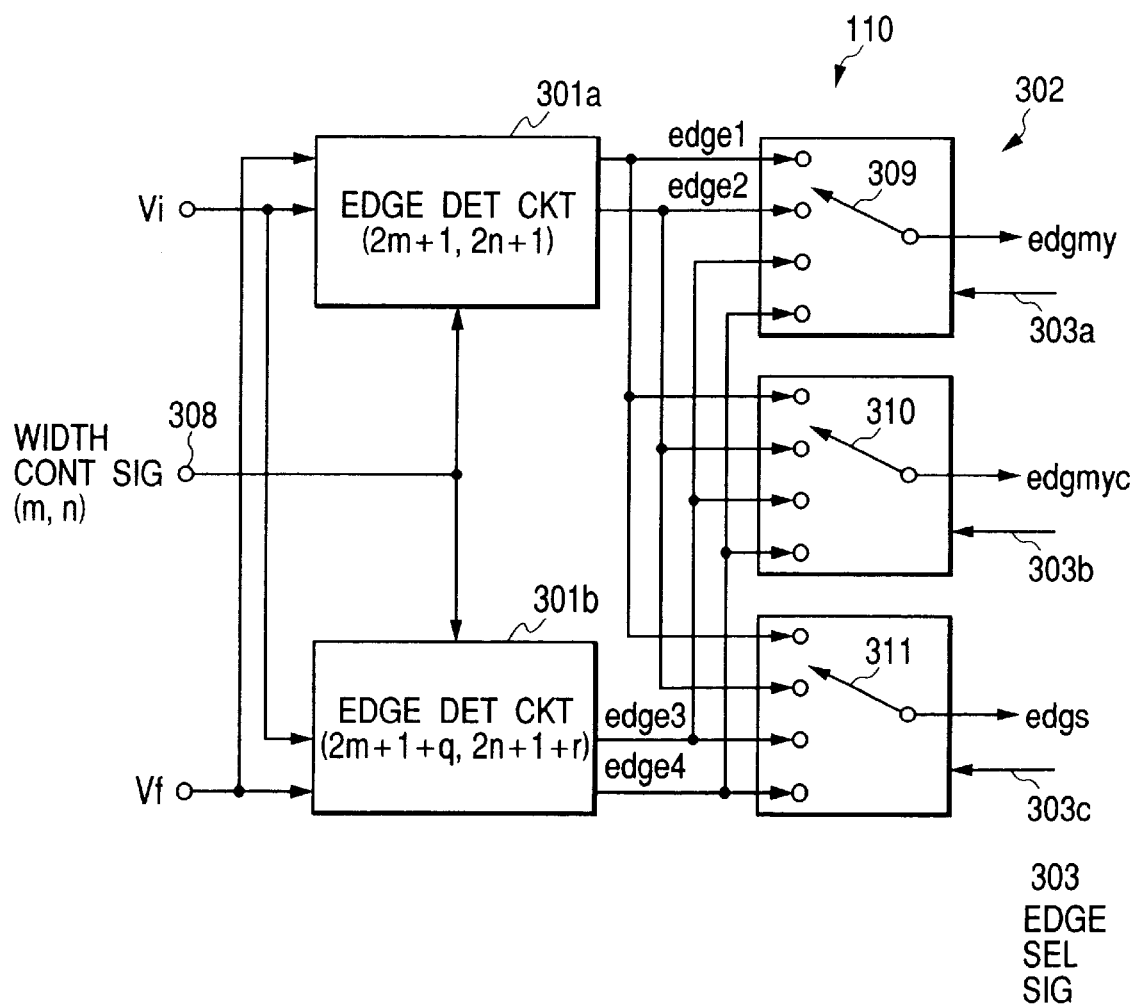
FIG. 8 is a block diagram of the edge detection signal generation circuit shown in FIG. 1.
Figure 9:
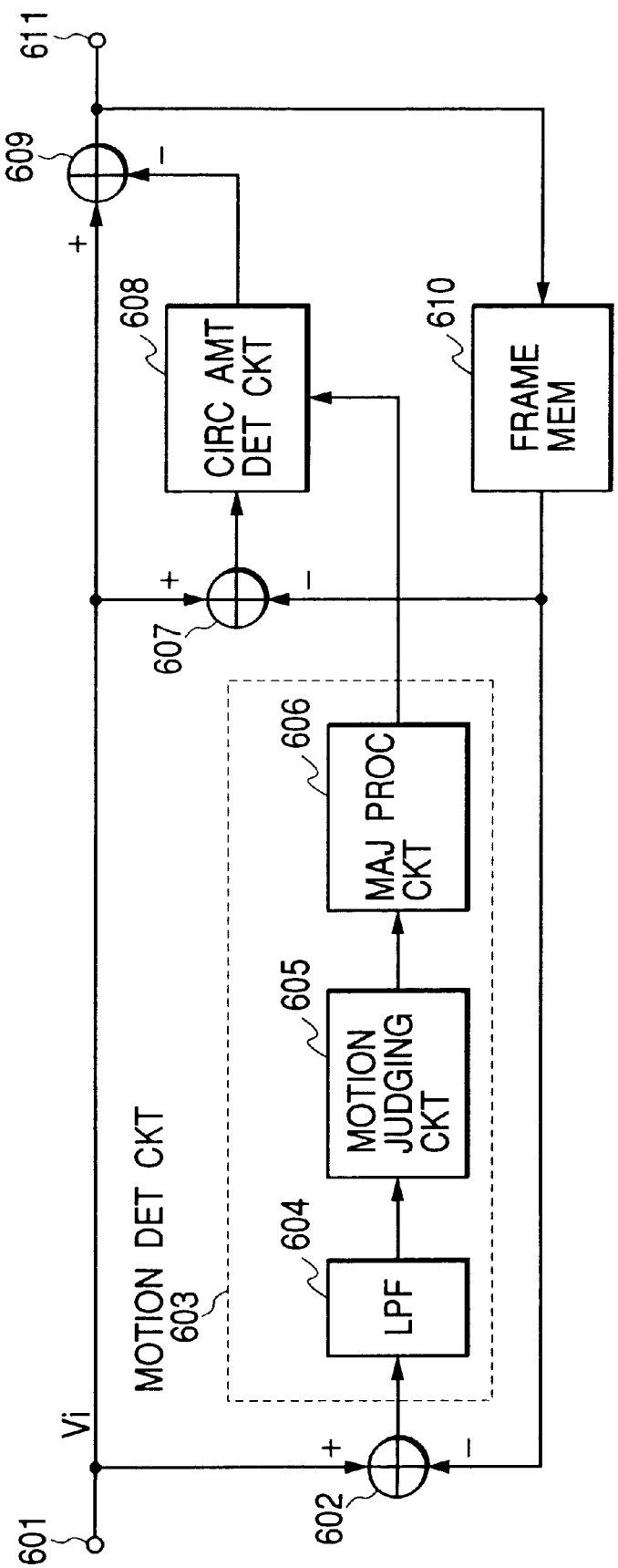
FIG. 9 is a block diagram of such a prior art noise suppression circuit including a prior art motion detection circuit.

FIG. 8 is a block diagram of the edge detection signal generation circuit 110 shown in FIG. 1.

The edge detection signal generation circuit 110 includes a first edge detection circuit 301a, a second edge detection circuit 301b, and an edge selector 302. The first edge detection circuit 301a detects an edge from the video signal Vi with a width corresponding to horizontally arranged (2m+1) pixels (the target pixel and m right pixels and m left pixels) and vertically arranged (2n+1) pixels (the target pixel and n upper pixels and n lower pixels) to generate the edge detection signal edge1 in accordance with the width control signal 308 and detects an edge from the video signal Vf with width corresponding to horizontally arranged (2m+1) pixels and vertically arranged (2n+1) pixels to generate the edge detection signal edge2 in accordance with the width control signal 308.

The second edge detection circuit 301b detects an edge from the video signal Vf with width corresponding to horizontally arranged (2m+1+q) pixels and vertically arranged (2n+1+r) pixels to generate the edge detection signal edge3 in accordance with the width control signal 308 and detects an edge from the video signal Vf with width corresponding to horizontally arranged (2m+1+q) pixels and vertically arranged (2n+1+r) pixels to generate the edge detection signal edge4 in accordance with the width control signal 308.

The edge selection circuit 309 outputs either the edge detection signal edge1, the edge detection signal edge2, the edge detection signal edge 3, or the edge detection signal edge4 in response to a selection signal 303a as the edge detection signal edgmy for the Y motion judging circuit 114. The edge selection circuit 310 outputs either the edge detection signal edge1, the edge detection signal edge2, the edge detection signal edge 3, or the edge detection signal edge4 in response to a selection signal 303b as the edge detection signal edgmyc for the YC motion judging circuit 115. The edge selection circuit 311 outputs either the edge detection signal edge1, the edge detection signal edge2, the edge detection signal edge3, or the edge detection signal edge4 in response to a selection signal 303c as the edge detection signal edgs for the majority determining circuit 112.

The edge detection signals edgmy and edgmyc represent an edge with H logic level (1) and a flat portion with L logic level (0).

The polarity deviation compensation circuit 204 (206) controls the size (M, N) of the upper left area UL, the upper right area UR, the lower left area LL, and the lower right area LR in accordance with the edge detection signal edgmy. More specifically, when the edge detection signal is H (1), the number of the pixels (M, N) at the area is reduced, for example 3×2 pixels and if the edge detection signal is L (0), the number of pixels (M×N) is made large, for example 5×2 pixels, as shown in FIGS. 5B to 5I. Thus, generation of after image is suppressed and noise at stopping areas is reduced.

Similarly, the edge detection signal edgs for the majority determining circuit 112 enables or disables the majority detector 112b. More specifically, when the edge detection signal edgs for the majority determining circuit 112 is H (1), the switch S1 outputs the judging result from the OR operation circuit 111 or the judging result from the majority detector 112b, so that it is prevented that the final judging result at the target pixel showing an edge is judged toward the stopping side again.

As mentioned, the motion detection is effected more accurately, so that after image by movement of image is suppressed and the noise at stopping image portions are suppressed.

What is claimed is:

1. A motion detection circuit comprising:
    delay means for generating a delayed video signal from a video signal including a luminance signal and a carrier color signal, said delayed video signal being delayed by one frame from said video signal;
    interframe difference signal generation means for generating an interframe difference signal from said video signal and said delayed video signal;
    filter means for filtering said interframe difference signal to remove said carrier color signal to output said interframe difference luminance signal;
    first motion judging means for judging whether an image at a target pixel in said video signal is moving from said interframe difference luminance signal to output a first motion judging result;
    second motion judging means for judging whether said image is moving from said interframe difference signal to output a second motion judging result; and
    third motion judging means for judging whether said image is moving by combining said first motion judging result with said second motion judging result to output a judging result.

2. A motion detection circuit as claimed in claim 1, further comprising edge detection signal generation means for detecting an edge at said target pixel in said video signal and detecting an edge at said target pixel in said delayed video signal and outputting an edge detection signal from either of said detected edge in said video signal or said detected edge in said delayed video signal selected in accordance with a selection signal, wherein said first motion judging means judges whether said image is moving from said interframe difference luminance signal at a pixel area around said target pixel, a size of said pixel area being controlled in accordance with said edge detection signal.

3. A motion detection circuit as claimed in claim 1, further comprising edge detection signal generation means for detecting an edge at said target pixel in said video signal and detecting an edge at said target pixel in said delayed video signal and outputting an edge detection signal from either of said detected edge in said video signal or said detected edge in said delayed video signal selected in accordance with a selection signal, wherein said second motion judging means judges whether said image is moving from said interframe difference signal at a pixel area around said target pixel, a size of said pixel area being controlled in accordance with said edge detection signal.

4. A motion detection circuit as claimed in claim 1, wherein said third motion judging means includes logical operation means for effecting logical operation between said first motion judging result from said first motion judging means and said second motion judging result from said second motion judging means such that, except when said first and second motion judging results agree with each other in a moving condition and a still condition, said logical operation result is biased toward said moving condition.

5. A motion detection circuit as claimed in claim 1, wherein said first motion detection means judges whether said image is moving with (J-1) threshold values to output J-valued said first motion judging result, J being a natural number more than one.

6. A motion detection circuit as claimed in claim 1, wherein said second motion detection means judges whether said image is moving with (J-1) threshold values to output J-valued said second motion judging result, J being a natural number more than one, said second motion detection means further comprising interline interpolation means for interpolating said J-valued second motion judging result such that said J-valued second motion judging result at the target pixel is changed to said moving condition when said J-valued second motion judging result at the corresponding pixel on at least one of adjacent lines is judged to be said moving condition and horizontal interpolation means for interpolating said J-valued second motion judging result such that said J-valued second motion judging result at the target pixel is changed to said moving condition when said J-valued second motion judging result of at least one of adjacent pixels on the same line is judged to be said moving condition.

7. A motion detection circuit as claimed in claim 1, wherein said first motion judging means comprises first peripheral pixel comparing means for detecting first polarities of said interframe difference luminance signal at each pixel at a first area around said target pixel and judging whether said image is moving in accordance with said detected first polarities with (J-1) threshold values to output a J-valued said first motion judging result, J being a natural number more than one, and said second motion judging means comprises second peripheral pixel comparing means for detecting second polarities of said interframe difference signal at every other pixel in the horizontal and vertical directions at a second area around said target pixel and judging whether said image is moving in accordance with said detected second polarities with said (J-1) threshold values to output J-valued said second motion judging result.

8. A motion detection circuit as claimed in claim 7, wherein said first motion judging means further comprises first polarity deviation detecting means for detecting third polarities of said interframe difference signal at each pixel of said video signal, detecting first agreement of said third polarities of all pixels at any of a first upper left area of said target pixel, a second upper right area of said target pixel, a first lower left area of said target pixel, and a first lower right area of said target pixel, and changing said first motion judging result from said first peripheral pixel comparing means from an intermediate moving condition to a moving condition in the presence of said first agreement when said first motion judging result from said peripheral pixel comparing means indicates said intermediate motion and said second motion judging means further comprises second polarity deviation detecting means for detecting fourth polarities of said interframe difference signal at each pixel of said video signal, detecting second agreement of said fourth polarities of every other pixels in the horizontal and vertical directions at any of a second upper left area of said target pixel, a second upper right area of said target pixel, a second lower left area of said target pixel, and a second lower right area of said target pixel, and changing said second motion judging result from said second peripheral pixel comparing means from an intermediate moving condition to a moving condition in the presence of said second agreement when said second motion judging result from said peripheral pixel comparing means indicates an intermediate moving condition.

9. A motion detection circuit as claimed in claim 1, further comprising majority detection means including a memory for detecting a majority of said judging results at Q pixels around said target pixels and judging said motion in said interframe difference signal at said target pixel in accordance with said detected majority to output said judging result such that said judging result is biased toward a moving condition when said judging results at Q pixels includes intermediate moving conditions, Q being a natural number more than one.

10. A motion detection circuit as claimed in claim 7, wherein said first peripheral pixel comparing means detects said first polarities among a positive polarity, a negative polarity, and a substantially zero level and said first peripheral pixel comparing means comprises comparing means for comparing said interframe difference luminance signal with a threshold value to detect said substantially zero level of said interframe difference luminance signal.

11. A motion detection circuit as claimed in claim 7, wherein said second peripheral pixel comparing means detects said second polarities among a positive polarity, a negative polarities, and a substantially zero level, said second peripheral pixel comparing means comprises comparing means for comparing said interframe difference signal with a threshold value to detect said substantially zero level of said interframe difference signal.

12. A motion detection circuit as claimed in claim 8, wherein said first polarity deviation detecting means detects said third polarities among a positive polarity, a negative polarity, and a substantially zero level and said first polarity deviation detecting means comprises comparing means for comparing said interframe difference luminance signal with a threshold value to detect said substantially zero level of said interframe difference luminance signal.

13. A motion detection circuit as claimed in claim 8, wherein said second polarity deviation detecting means detects said fourth polarities among a positive polarity, a negative polarities, and a substantially zero level, said second polarity deviation detecting means comprises comparing means for comparing said interframe difference signal with a threshold value to detect said substantially zero level of said interframe difference signal.

14. A motion detection circuit as claimed in claim 8, further comprising edge detection signal generation means for detecting an edge at said target pixel in said video signal and detecting an edge at said pixel in said delayed video signal and outputting an edge detection signal from either of said detected edge in said video signal or said detected edge in said delayed video signal selected in accordance with a selection signal.

15. A motion detection circuit as claimed in claim 14, wherein said first polarity deviation detecting means changes a size of said first upper left area, said second upper right area, said first lower left area, and said first lower right area in accordance with said edge detection signal.

16. A motion detection circuit as claimed in claim 14, wherein said second polarity deviation detecting means changes a size of said second upper left area, said second upper right area, said second lower left area, and said second lower right area in accordance with said edge detection signal.

17. A motion detection circuit as claimed in claim 9, further comprising edge detection signal generation means for detecting an edge at said target pixel in said video signal and detecting an edge in said delayed video signal and outputting an edge detection signal from either of said detected edge in said video signal or said detected edge in said delayed video signal selected in accordance with a selection signal, wherein said majority detection means includes switching means for outputting either of said motion judging result judged in accordance with said detected majority or said judging result from said third motion judging means in accordance with said edge detection signal.

18. A noise suppression apparatus comprising:
a motion detection circuit including:
delay means for generating a delayed video signal from a video signal including a luminance signal and a carrier color signal, said delayed video signal being delayed by one frame from said video signal:
interframe difference signal generation means for generating an interframe difference signal from said video signal and said delayed video signal;
filter means for filtering said interframe difference signal to remove carrier color signal to output said interframe difference luminance signal;
first motion judging means for judging whether an image at a target pixel in said video signal is moving from said interframe difference luminance signal to output a first motion judging result;

second motion judging means for judging whether said image is moving from said interframe difference signal to output a second motion judging result; and third motion judging means for judging whether said image is moving by combining said first motion judging result with said second motion judging result to output a judging result;

circulation signal generation means including:
coefficient generation means for generating a coefficient k, $k \leq 0 < 1$ in accordance with said judging result of said motion detection circuit; and
multiplier for multiplying said video signal by said coefficient k to output a circulation signal; and difference signal generation means for generating a difference signal between said circulation signal and said video signal to output a noise suppressed video signal.

19. A noise suppression apparatus as claimed in claim 18, wherein said coefficient k generated when said motion judging circuit judges that said image is in a stopping condition is greater than said coefficient k generated when said motion judging means judges that said image is in a moving condition.

20. A noise suppression apparatus as claimed in claim 18, further comprising edge detection signal generation means for detecting an edge at said target pixel in said video signal and detecting an edge at said target pixel in said delayed video signal and outputting an edge detection signal from either of said detected edge in said video signal or said detected edge in said delayed video signal selected in accordance with a selection signal, wherein said first motion judging means judges whether said image is moving from said interframe difference luminance signal at a pixel area around said target pixel, a size of said pixel area being controlled in accordance with said edge detection signal.

21. A noise suppression apparatus as claimed in claim 18, further comprising edge detection signal generation means for detecting an edge at said target pixel in said video signal and detecting an edge at said target pixel in said delayed video signal and outputting an edge detection signal from either of said detected edge in said video signal or said detected edge in said delayed video signal selected in accordance with a selection signal, wherein said second motion judging means judges whether said image is moving from said interframe difference signal at a pixel area around said target pixel, a size of said pixel area being controlled in accordance with said edge detection signal.

22. A noise suppression apparatus as claimed in claim 18, wherein said third motion judging means includes logical operation means for effecting logical operation between said first motion judging result from said first motion judging means and said second motion judging result from said second motion judging means such that, except when said first and second motion judging results agree with each other in a moving condition and a still condition, said logical operation result is biased toward said moving condition.

23. A noise suppression apparatus as claimed in claim 18, wherein said first motion detection means judges whether said image is moving with (J-1) threshold values to output J-valued said first motion judging result, J being a natural number more than one.

24. A noise suppression apparatus as claimed in claim 18, wherein said second motion detection means judges whether said image is moving with (J-1) threshold values to output J-valued said second motion judging result, J being a natural number more than one, said second motion detection means further comprising interline interpolation means for interpolating said J-valued second motion judging result such that said J-valued second motion judging result at the target pixel is changed to said moving condition when said J-valued second motion judging result at the corresponding pixel on at least one of adjacent lines is judged to be said moving condition and horizontal interpolation means for interpolating said J-valued second motion judging result such that said J-valued second motion judging result at the target pixel is changed to said moving condition when said J-valued second motion judging result of at least one of adjacent pixels on the same line is judged to be said moving condition.

25. A noise suppression apparatus as claimed in claim 18, wherein said first motion judging means comprises first peripheral pixel comparing means for detecting first polarities of said interframe difference luminance signal at each pixel at a first area around said target pixel and judging whether said image is moving in accordance with said detected first polarities with (J-1) threshold values to output a J-valued said first motion judging result, J being a natural number more than one, and said second motion judging means comprises second peripheral pixel comparing means for detecting second polarities of said interframe difference signal at every other pixel in the horizontal and vertical directions at a second area around said target pixel and judging whether said image is moving in accordance with said detected second polarities with said (J-1) threshold values to output J-valued said second motion judging result.

26. A noise suppression apparatus as claimed in claim 25, wherein said first motion judging means further comprises first polarity deviation detecting means for detecting third polarities of said interframe difference signal at each pixel of said video signal, detecting first agreement of said third polarities of all pixels at any of a first upper left area of said target pixel, a second upper right area of said target pixel, a first lower left area of said target pixel, and a first lower right area of said target pixel, and changing said first motion judging result from said first peripheral pixel comparing means from an intermediate moving condition to a moving condition in the presence of said first agreement when said first motion judging result from said peripheral pixel comparing means indicates said intermediate motion and said second motion judging means further comprises second polarity deviation detecting means for detecting fourth polarities of said interframe difference signal at each pixel of said video signal, detecting second agreement of said fourth polarities of every other pixels in the horizontal and vertical directions at any of a second upper left area of said target pixel, a second upper right area of said target pixel, a second lower left area of said target pixel, and a second lower right area of said target pixel, and changing said second motion judging result from said second peripheral pixel comparing means from an intermediate moving condition to a moving condition in the presence of said second agreement when said second motion judging result from said peripheral pixel comparing means indicates an intermediate moving condition.

27. A noise suppression apparatus as claimed in claim 18, further comprising majority detection means including a memory for detecting a majority of said judging results at Q pixels around said target pixels and judging said motion in said interframe difference signal at said target pixel in accordance with said detected majority to output said judging result such that said judging result is biased toward a moving condition when said judging results at Q pixels includes intermediate moving conditions, Q being a natural number more than one.

28. A noise suppression apparatus as claimed in claim 25, wherein said first peripheral pixel comparing means detects said first polarities among a positive polarity, a negative polarity, and a substantially zero level and said first peripheral pixel comparing means comprises comparing means for comparing said interframe difference luminance signal with a threshold value to detect said substantially zero level of said interframe difference luminance signal.

29. A noise suppression apparatus as claimed in claim 25, wherein said second peripheral pixel comparing means detects said second polarities among a positive polarity, a negative polarities, and a substantially zero level, said second peripheral pixel comparing means comprises comparing means for comparing said interframe difference signal with a threshold value to detect said substantially zero level of said interframe difference signal.

30. A noise suppression apparatus as claimed in claim 26, wherein said first polarity deviation detecting means detects said third polarities among a positive polarity, a negative polarity, and a substantially zero level and said first polarity deviation detecting means comprises comparing means for comparing said interframe difference luminance signal with a threshold value to detect said substantially zero level of said interframe difference luminance signal.

31. A noise suppression apparatus as claimed in claim 26, wherein said second polarity deviation detecting means detects said fourth polarities among a positive polarity, a negative polarities, and a substantially zero level, said second polarity deviation detecting means comprises comparing means for comparing said interframe difference signal with a threshold value to detect said substantially zero level of said interframe difference signal.

32. A noise suppression apparatus as claimed in claim 26, further comprising edge detection signal generation means for detecting an edge at said target pixel in said video signal and detecting an edge at said pixel in said delayed video signal and outputting an edge detection signal from either of said detected edge in said video signal or said detected edge in said delayed video signal selected in accordance with a selection signal.

33. A noise suppression apparatus as claimed in claim 32, wherein said first polarity deviation detecting means changes a size of said first upper left area, said second upper right area, said first lower left area, and said first lower right area in accordance with said edge detection signal.

34. A noise suppression apparatus as claimed in claim 32, wherein said second polarity deviation detecting means changes a size of said second upper left area, said second upper right area, said second lower left area, and said second lower right area in accordance with said edge detection signal.

35. A noise suppression apparatus as claimed in claim 27, further comprising edge detection signal generation means for detecting an edge at said target pixel in said video signal and detecting an edge in said delayed video signal and outputting an edge detection signal from either of said detected edge in said video signal or said detected edge in said delayed video signal selected in accordance with a selection signal, wherein said majority detection means includes switching means for outputting either of said motion judging result judged in accordance with said detected majority or said judging result from said third motion judging means in accordance with said edge detection signal.

\* \* \* \* \*